US012645475B2

(12) United States Patent
Kashtan et al.

(10) Patent No.: US 12,645,475 B2
(45) Date of Patent: Jun. 2, 2026

(54) SOFTWARE OPERATOR FOR DEPLOYING AND MANAGING BARE METAL CLUSTERS ACCORDING TO CONFIGURATION FILES BASED ON DETERMINED SETS OF RESOURCES

(71) Applicant: Red Hat, Inc., Raleigh, NC (US)

(72) Inventors: Yuval Kashtan, Westford, MA (US); Michael Gourin, Jerusalem (IL)

(73) Assignee: Red Hat, Inc., Raleigh, NC (US)

( * ) Notice: Subject to any disclaimer, the term of this patent is extended or adjusted under 35 U.S.C. 154(b) by 537 days.

(21) Appl. No.: 18/189,641

(22) Filed: Mar. 24, 2023

(65) Prior Publication Data

US 2024/0320022 A1 Sep. 26, 2024

(51) Int. Cl.
G06F 9/455 (2018.01)
G06F 11/07 (2006.01)

(52) U.S. Cl.
CPC ...... G06F 9/45541 (2013.01); G06F 11/0784 (2013.01)

(58) Field of Classification Search
CPC .................. G06F 9/45541; G06F 11/0784
See application file for complete search history.

(56) References Cited

U.S. PATENT DOCUMENTS

| | | | | | |
|---|---|---|---|---|---|
| 11,477,090 | B1 * | 10/2022 | Birsan | .................. | H04L 41/0895 |
| 11,665,063 | B1 * | 5/2023 | Luthra | ..................... | H04L 67/10 |
| | | | | | 709/220 |
| 2006/0037030 | A1 * | 2/2006 | Kovachka-Dimitrova | .................. | |
| | | | | | G06F 8/61 |
| | | | | | 719/328 |
| 2016/0028685 | A1 * | 1/2016 | Chu | ..................... | H04L 61/5007 |
| | | | | | 709/245 |
| 2017/0012879 | A1 * | 1/2017 | Chai | ......................... | G06F 9/50 |
| 2017/0063627 | A1 * | 3/2017 | Viswanathan | ...... | H04L 41/0893 |
| 2021/0243250 | A1 * | 8/2021 | Agarwal | ................ | H04L 43/12 |
| 2023/0119782 | A1 * | 4/2023 | Zhai | ..................... | H04L 67/1097 |
| | | | | | 709/245 |
| 2023/0199489 | A1 * | 6/2023 | Austin | .................. | H04L 9/3215 |
| | | | | | 713/168 |

(Continued)

OTHER PUBLICATIONS

Coghlan, "Event Driven Scheduling," Beaker, Design Proposals, retrieved Mar. 24, 2023: pp. 1-7, <https://beaker-project.org/dev/proposals/event-driven-scheduler.html>.

*Primary Examiner* — Michael W Ayers
(74) *Attorney, Agent, or Firm* — Kilpatrick Townsend & Stockton LLP

(57) ABSTRACT

A system can be provided for deploying bare metal clusters that satisfy custom resource requests. For example, the system can receive from a client device, a custom resource request. The custom resource request can include a set of requirements for a bare metal cluster. The set of requirements can include a number of nodes for the bare metal cluster. The system can determine a set of resources that satisfies the set of requirements. The set of resources can include virtual Internet Protocol (IP) addresses and a set of baseband management controller (BMC) IP addresses. A number of BMC IP addresses in the set of BMC IP addresses can be equal to the number of nodes for the bare metal cluster. Additionally, the system can generate, based on the set of resources, a configuration file for the bare metal cluster and deploy, based on the configuration file, the bare metal cluster.

20 Claims, 3 Drawing Sheets

300

302
Receive, from a client device, a custom resource request comprising a set of requirements for a bare metal cluster

304
Determine a set of resources that satisfies the set of requirements, the set of resources comprising at least two virtual internet protocol (IP) addresses and a set of BMC IP addresses

306
Generate a configuration file for the bare metal cluster based on the set of resources

308
Deploy the bare metal cluster based on the configuration file

(56) References Cited

U.S. PATENT DOCUMENTS

2023/0259381 A1 * 8/2023 Ramanathan ....... G06F 9/45558
718/1

\* cited by examiner

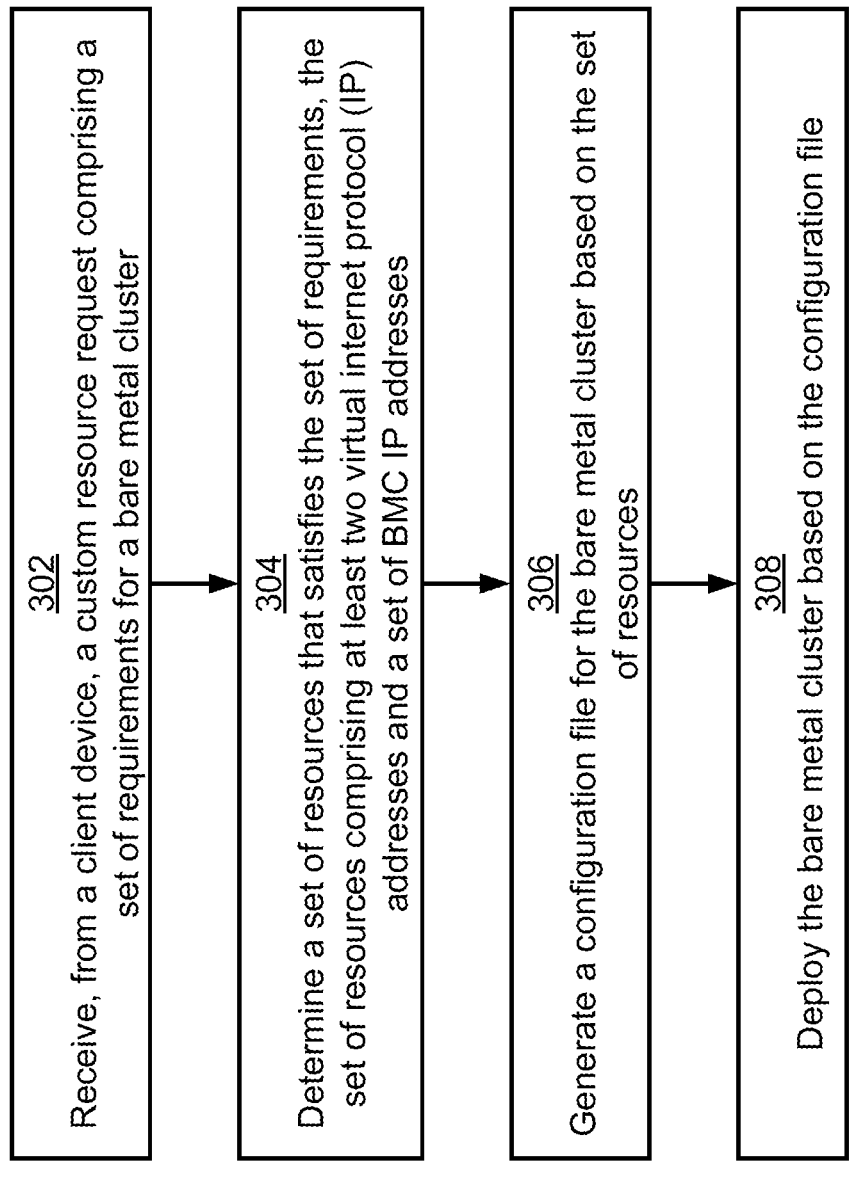

300

302
Receive, from a client device, a custom resource request comprising a set of requirements for a bare metal cluster

304
Determine a set of resources that satisfies the set of requirements, the set of resources comprising at least two virtual internet protocol (IP) addresses and a set of BMC IP addresses

306
Generate a configuration file for the bare metal cluster based on the set of resources

308
Deploy the bare metal cluster based on the configuration file

FIG. 3

SOFTWARE OPERATOR FOR DEPLOYING AND MANAGING BARE METAL CLUSTERS ACCORDING TO CONFIGURATION FILES BASED ON DETERMINED SETS OF RESOURCES

TECHNICAL FIELD

The present disclosure relates generally to cluster deployment and, more particularly (although not necessarily exclusively), to a software operator for deploying and managing bare metal clusters.

BACKGROUND

A computing environment may include several nodes (e.g., physical machines) that may be physically separate but communicatively coupled to one another via a network, such as a local area network or the Internet. The nodes may be executing the same operating system or different operating systems to one another. A cluster, such as a Kubernetes cluster, can be a set of nodes in the computing environment that run containerized applications. Bare metal clusters can be clusters deployed directly on the nodes, rather than, for example, inside virtual machines associated with the nodes. Thus, containerized applications of the bare metal clusters can be running directly on the one or more operating systems of the set of nodes.

Deploying clusters on bare metal (i.e., on the physical machines) can be associated with better overall performance and higher security for the containerized applications. For example, clusters deployed in virtual machines can run on hypervisor layers. The hypervisor layers can consume resources from operating systems of the nodes on which the virtual machines are operating, thereby decreasing available resources for the cluster. Conversely, clusters deployed on bare metal can have access to all available resources of the operating systems, which can result in better performance for the containerized applications. Additionally, each node of a bare metal cluster can run as a standalone server. Thus, a security breach of one node may not affect other nodes.

BRIEF DESCRIPTION OF THE DRAWINGS

FIG. 3 is a flowchart of a process for deploying and managing bare metal clusters according to one example of the present disclosure.

DETAILED DESCRIPTION

Figure 1:
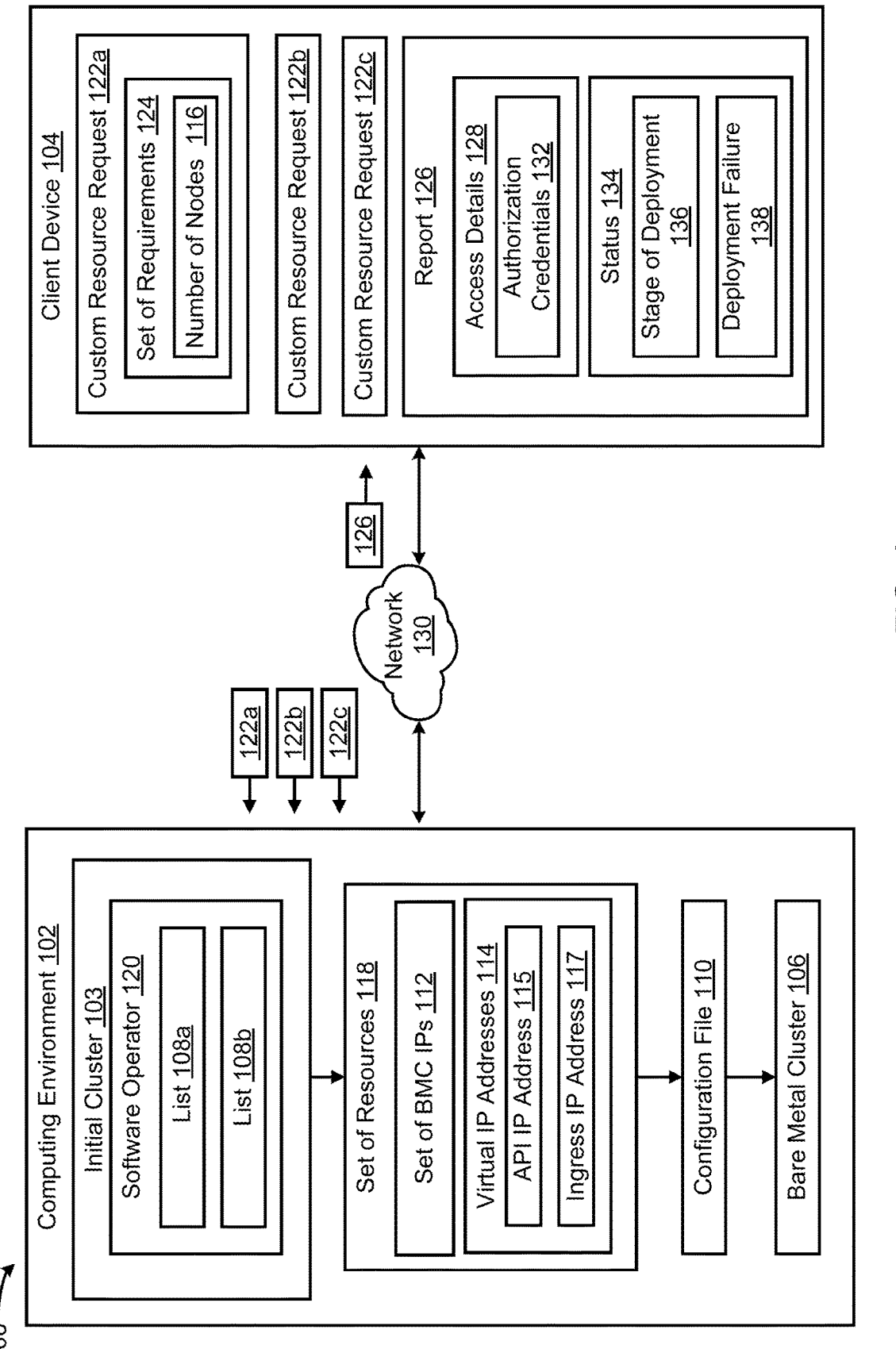
FIG. 1 is a block diagram of an example of a system for deploying and managing bare metal clusters according to one example of the present disclosure.

To deploy a bare metal cluster on a set of nodes (e.g., servers or other suitable physical machines), each node must be configured prior to deployment. Additionally, a unique approach may be required to configure each node for deployment. Current systems for deploying bare metal clusters, may perform manual or semi-manual processes to configure the set of nodes. For example, each node may be manually assigned an Internet Protocol (IP) address, a host name, other suitable domain name system (DNS) records, or a combination thereof. Thus, provisioning the set of nodes for bare metal cluster deployment can be a time consuming and inefficient process. Additionally, due to the bare metal cluster being deployed directly on the set of nodes, there is not a virtualization layer (e.g., a hypervisor layer) between one or more operating systems of the set of nodes and the bare metal cluster. Without the virtualization layer, there may not be a way for a user to manage, interact with, or receive updates regarding the bare metal cluster during or after deployment. Moreover, because each node can operate as a standalone server and the bare metal cluster is deployed directly on the set of nodes, failure of a node can disrupt all applications running in the cluster. Therefore, in cases of node failure, there can be a need for efficient detection and redeployment of the bare metal cluster.

Some examples of the present disclosure can overcome one or more of the abovementioned problems via a software operator that can deploy and manage bare metal clusters. The software operator can receive a custom resource request from a client device, which can be a request for deployment of a bare metal cluster. The software operator can automatically allocate and provision a set of nodes for the bare metal cluster based on a set of requirements provided by a user of the client device and included in the custom resource request. For example, the user may provide a number of nodes or other suitable requirements for the bare metal cluster. In this way, the software operator may automate the configuration of nodes and can deploy a bare metal cluster that satisfies user requirements. Additionally, the software operator can transmit, to the client device, statuses associated with stages of deployment of the bare metal cluster, access details for the bare metal cluster, or other suitable information about the bare metal cluster. Thus, the software operator can provide updates regarding the bare metal cluster to the user and can provide credentials and access to the bare metal cluster for the client device. The software operator can also facilitate efficient detection and redeployment in response to node failure. For example, the software operator can, via the transmission of the statuses, notify the user of a node failure. In response, the client device may transmit a new custom resource to the software operator, or the software operator may automatically redeploy the bare metal cluster based on the custom resource request.

In a particular example, a software operator can be running in an initial cluster in a computing environment that includes several nodes. The software operator can receive a custom resource request for a bare metal cluster from a client device. The custom resource request can include a set of requirements for the bare metal cluster. For example, the set of requirements can indicate that the cluster is to be deployed on bare metal (i.e., rather than on virtual machines or a mixed environment) and can specify that the bare metal cluster should include three nodes. In response, the software operator can determine a set of resources that satisfy the set of requirements. For example, the software operator can access a first list of available baseband management controller (BMC) IP addresses and can select three of the available BMC IP addresses. Each of the available BMC IP addresses may be associated with a BMC, which can be a specialized processor for monitoring and managing each of the nodes in the computing environment. Thus, each of the nodes can have a BMC and an associated BMC IP address. The BMCs can further enable the software operator to deploy the cluster on each of the nodes or perform other suitable actions with respect to the nodes. Therefore, the software operator may require BMC IP addresses for each node associated with the bare metal cluster. Additionally, the software operator can access a second list of available application programming interface (API) IP addresses and corresponding ingress IP addresses. The software operator can select an API IP address from the second list. The software operator may generate a configuration file that defines an environment for the bare metal cluster. The configuration file may include the three BMC IP addresses selected, the API IP address selected, and the ingress IP address that corresponds to the selected API IP address. Then, the software operator may deploy the bare metal cluster in the computing environment based on the configuration file.

The software operator may further transmit a report to the client device. The report may be transmitted in response to the bare metal cluster being deployed and may be updated over stages of deployment. For example, the report may include a status field with a status of "deploying" to indicate that the deployment is in process and the status field may be updated to a status of "ready" when the deployment is complete. The report may also include the configuration file or the information from the configuration file (e.g., the three BMC IP addresses, the API IP address, and the ingress IP address).

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a system 100 for deploying and managing bare metal clusters according to one example of the present disclosure. The system 100 can include a computing environment 102. The computing environment 102 may be a distributed computer system formed from one or more nodes (e.g., physical servers) that are in communication with one another via a network 130. Additionally, the computing environment 102 can be in communication with a client device 104 via the network 130. Examples of the network 130 can include a local area network (LAN) or the Internet. The computing environment 102 can further be formed from a physical infrastructure that includes various network hardware, such as routers, hubs, bridges, switches, and firewalls. The physical infrastructure can also include one or more servers on which bare metal clusters can be deployed to run containerized applications.

The computing environment 102 can include an initial cluster 103 on which a software operator 120 for deploying and managing bare metal clusters can be deployed. The initial cluster 103 may be a bare metal cluster, a virtual cluster, or a mixed environment cluster. The software operator 120 may be a software extension, such as a stateful application, that can manage assigned resources (e.g., nodes, IP addresses, etc.). Once deployed on the initial cluster 103, the software operator 120 can create, configure, and manage instances of the assigned resources on behalf of a user in a declarative way. In some examples, to manage resources, the software operator 120 may receive or include pre-configured lists of resources available to the software operator 120 for use in deploying bare metal clusters. For example, there can be a first list 108a of the nodes that form the computing environment 102. The first list 108a may also associate a baseband management controller (BMC) IP address with each of the nodes. Additionally, there can be a second list 108b of virtual IP addresses. The virtual IP addresses can include API IP addresses and corresponding ingress IP addresses.

In some examples, the software operator 120 may receive a first custom resource request 122a from the client device 104. The first custom resource request 122a can be a request for a bare metal cluster 106 to be deployed and can include a set of requirements 124 for the bare metal cluster 106. The set of requirements 124 may include a type of cluster (e.g., Openshift-MNO, Openshift-SNO, Kubernetes, etc.), a version of the cluster, a number of nodes 116 for the cluster, other suitable requirements, or a combination thereof. In some examples, the set of requirements 124 may also include how many of the number of nodes 116 are to be worker nodes and how many of the number of nodes 116 are to be management nodes. The management nodes can be responsible for maintaining the state of a cluster and the worker nodes can be responding for executing containers running on the cluster.

In response to receiving the first custom resource request 122a, the software operator 120 may determine a set of resources 118 that satisfy the set of requirements 124. The set of resources 118 may include virtual IP addresses 114, such as an application programming interface (API) IP address 115 and a corresponding ingress IP address 117. The set of resources 118 may also include a set of BMC IP addresses 112. A number of BMC IP addresses in the set of BMC IP addresses 112 may be equal to the number of nodes 116.

In some examples, to determine the set of resources 118, the software operator 120 may detect which BMC IP addresses and virtual IP addresses are available. For example, the first list 108a can include an indication of whether each BMC IP address is available. Similarly, the second list 108b can include an indication of whether each virtual IP address is available. When a bare metal cluster is deployed, the lists 108a-b can be updated to indicate that resources (i.e., BMC IP addresses and virtual IP addresses) used for the bare metal cluster are unavailable. Likewise, when deployment of a bare metal cluster is terminated, the lists 108a-b can be updated to indicate that resources used for the bare metal cluster are available. Thus, BMC IP addresses can be available if the BMC IP addresses are associated with nodes that are not currently in use (i.e., nodes not being used for another bare metal cluster). The virtual IP addresses can also be available if the virtual IP addresses are not being used for another bare metal cluster. After detecting which BMC IP addresses and virtual IP addresses are available, such as based on the indications in the lists 108a-b, the software operator 120 can select the virtual IP addresses 114 and can select the set of BMC IP addresses 112. Thus, the virtual IP addresses 114 and the set of BMC IP addresses 112 can be resources that are available and that best satisfy the set of requirements 124.

In an alternative example, a first list may be a list of all available resources and a second list may be a list of all unavailable resources. Thus, in the alternative example, the software operator 120 may select the set of BMC IP addresses 112 and the virtual IP addresses 114 from the first list.

Additionally, in another example, a first list can be a list of API IP addresses, a second list can be a list of ingress IP addresses, and a third list can be a list of the BMC IP addresses. The first list can include an indication of whether each API IP address is available. Similarly, the second list can include an indication of whether each ingress IP address is available, and the third list can include an indication of whether each BMC IP address is available. When a bare metal cluster is deployed, the lists can be updated to indicate that resources (e.g., an API IP address, an Ingress IP address, and one or more BMC IP addresses) used for the bare metal cluster are unavailable. Likewise, when deployment of a bare metal cluster is terminated, the lists can be updated to indicate that resources used for the bare metal cluster are available. Thus, BMC IP addresses can be available if the BMC IP addresses are associated with nodes that are not currently in use (i.e., nodes not being used for another bare metal cluster). The API IP addresses and the ingress IP addresses can also be available if not being used for another bare metal cluster. After detecting which BMC IP addresses, API IP addresses, and ingress IP addresses are available, such as based on the indications in the lists, the software operator 120 can select an API IP address 115, can select an ingress IP address 117, and can select the set of BMC IP addresses 112. Thus, the API IP address 115, the ingress IP address 117, and the set of BMC IP addresses 112 can be the resources that are available and that best satisfy the set of requirements 124.

The software operator 120 can further generate, based on the set of resources 118, a configuration file 110. The configuration file 110 can describe an environment in which the bare metal cluster 106 can be deployed. For example, the configuration file 110 can include the set of BMC IP addresses 112 and the virtual IP addresses 114. The configuration file 110 may also include addition information about the environment, such as related to the set of requirements 124. For example, the configuration file 110 may include the type of cluster and version of the cluster as included in the set of requirements 124. The configuration file 110 may also include the number of management nodes and an indication of which BMC IP addresses are associated with the management nodes and the number of worker nodes and an indication of which BMC IP addresses are associated with the worker nodes.

The software operator 120 can then deploy the bare metal cluster 106 based on the configuration file 110. In this way, the bare metal cluster 106 can be automatically deployed and can meet the set of requirements 124. In some examples, the software operator 120 may deploy the bare metal cluster 106 in stages. For example, the software operator 120 may deploy the bare metal cluster 106 on the management nodes prior to deploying the bare metal cluster 106 on the worker nodes.

Additionally, deploying the bare metal cluster 106 can cause the set of resources 118 to become unavailable. Conversely, in some examples, the client device 104 may transmit a termination request to the computing environment 102 to cause the computing environment to terminate the first custom resource request 122a. The termination of the first custom resource request 122a can cause the bare metal cluster to be terminated, thereby causing the set of resources 118 to become available.

Additionally, in some examples, the software operator 120 may transmit a report 126 to the client device 104 during deployment of the bare metal cluster 106. In some examples, the software operator 120 may transmit the report 126 in response to a status request or other suitable request for information associated with the bare metal cluster 106 received from the client device 104. The information can be stored in a database or other suitable storage mechanism accessible via the computing environment 103. Therefore, the computing environment 102 can retrieve the information from the database or other suitable storage mechanism in response to status request or other suitable requests. In this way, the computing environment 103 can enable the client device 104 or another suitable authorized device to query information associated with the bare metal cluster and can provide the information in the report 126.

For example, the report 126 can include a status 134, which may indicate a stage of deployment 136 of the bare metal cluster 106 or may indicate a deployment failure 138 of the bare metal cluster 106. Additionally, the report 126 can include access details 128 for the bare metal cluster 106 and may include other suitable information related to the bare metal cluster 106. The access details 128 can include the set of BMC IP addresses 112, the virtual IP addresses 114, authorization credentials 132, or a combination thereof. The authorization credentials 132 can be used by the client device 104 to access the bare metal cluster 106.

In some examples, the report 126 can be updated throughout deployment of the bare metal cluster 106. For example, the status 134 may be updated at each stage of deployment 136. For example, a first status (e.g., NEW) can indicate a first stage of deployment in which the software operator 120 may have received the first custom resource request 122a. Then, a second status (e.g., ALLOCATING) can correspond to a second stage of deployment in which the software operator 120 can be determining the set of resources 118 that satisfy the set of requirements 124. Additionally, a third status (e.g., BOOTSTRAPPING) can correspond to a third stage of deployment in which the software operator 120 can be configuring the set of resources 118 or generating the configuration file 110. A fourth status and a fifth status (e.g., DEPLOYING-MANAGERS and DEPLOYING-WORKERS) may correspond to a fourth and fifth stage of deployment in which the software operator 120 may be deploying the bare metal cluster 106 on the management nodes and the worker nodes. Finally, a sixth status (e.g., READY) can correspond to a sixth stage of deployment in which the bare metal cluster 106 may be deployed and ready to run containers. Other statuses and stages of deployment are also possible.

In an example, the bare metal cluster 106 may fail to deploy. The software operator 120 may detect the deployment failure 138, which can occur at any stage of deployment. As a result, the software operator 120 may update the status 134 to indicate the deployment failure 138. Additionally, the software operator 120 may transmit an indicator of the stage of deployment at which the failure occurred or an event associated with the deployment failure 138. For example, the software operator 120 may transmit a second report or update the report 126 to include the stage of deployment at which the failure occurred or the event. The event may be more specific than the stage of deployment. For example, the failure may have occurred at a deployment stage of deploying the bare metal cluster 106 on the management nodes and the event may be deployment of the bare metal cluster 106 on a particular management node. Additionally, the software operator 120 may terminate the deployment and may automatically attempt to redeploy the bare metal cluster 106. In some examples, the client device 104 may transmit a termination request for the software operator 120 to terminate the bare metal cluster 106. Then, the client device 104 may transmit a second custom resource request 122b to initiate a new deployment of a second bare metal cluster. The second custom resource request 122b may include a second set of requirements, which can be the same or similar to the set of requirements 124.

Although FIG. 1 depicts a certain number and arrangement of components, this is for illustrative purposes and intended to be non-limiting. Other examples may include more components, fewer components, different components, or a different arrangement of the components shown in FIG. 1.

Figure 2:
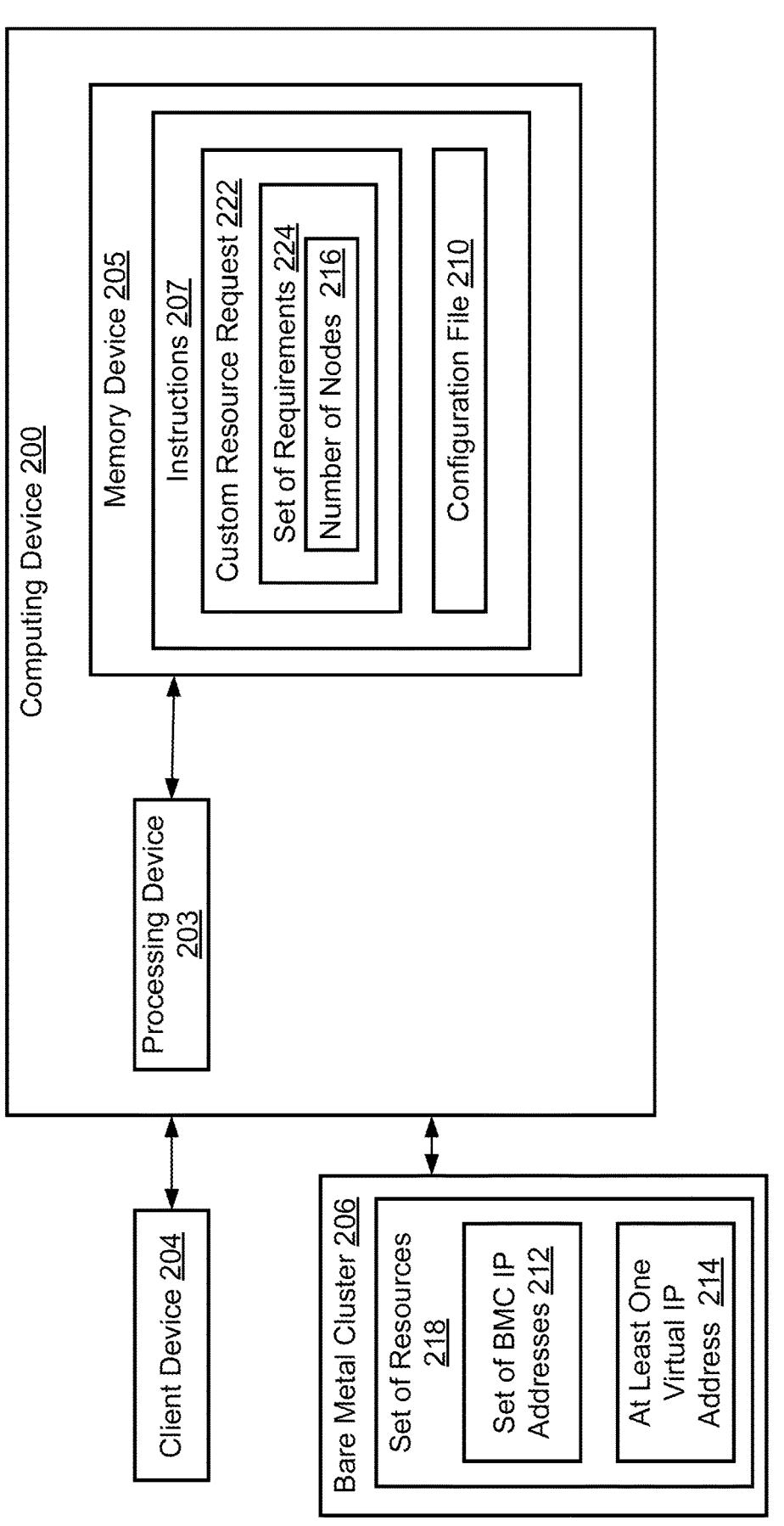
FIG. 2 is a block diagram of an example of a computing device for deploying and managing bare metal clusters according to one example of the present disclosure.

FIG. 2 is a block diagram of an example of a computing device 200 for deploying and managing bare metal clusters according to one example of the present disclosure. The computing device 200 can include a processing device 203 communicatively coupled to a memory device 205.

The processing device 203 can include one processing device or multiple processing devices. Non-limiting examples of the processing device 203 include a Field-Programmable Gate Array (FPGA), an application-specific integrated circuit (ASIC), and a microprocessor. The processing device 203 can execute instructions 207 stored in the memory device 205 to perform operations. In some examples, the instructions 207 can include processor-specific instructions generated by a compiler or an interpreter from code written in any suitable computer-programming language, such as C, C++, C #, Java, Python, or any combination of these.

The memory device 205 can include one memory device or multiple memory devices. The memory device 205 can be non-volatile and may include any type of memory device that retains stored information when powered off. Non-limiting examples of the memory device 205 include electrically erasable and programmable read-only memory (EEPROM), flash memory, or any other type of non-volatile memory. At least some of the memory device 205 includes a non-transitory computer-readable medium from which the processing device 203 can read instructions 207. A computer-readable medium can include electronic, optical, magnetic, or other storage devices capable of providing the processing device 203 with the instructions 207 or other program code. Non-limiting examples of a computer-readable medium include magnetic disk(s), memory chip(s), ROM, random-access memory (RAM), an ASIC, a configured processor, and optical storage.

The processing device 203 can execute instructions 207. For example, the processing device 203 can receive, from a client device 204, a custom resource request 222 that can include a set of requirements 224 for a bare metal cluster 206. The set of requirements 224 can include a number of nodes 216 for the bare metal cluster 206. The processing device 203 can also determine a set of resources 218 that satisfies the set of requirements 224. The set of resources 218 can include at least two virtual IP addresses 214 and a set of baseband management controller (BMC) IP addresses 212. A number of BMC IP addresses in the set of BMC IP addresses 212 can be equal to the number of nodes 216 for the bare metal cluster 206. Additionally, the processing device 203 can generate, based on the set of resources 218, a configuration file 210 for the bare metal cluster 206 and can deploy, based on the configuration file 210, the bare metal cluster 206.

FIG. 3 is a flowchart of a process for deploying and managing bare metal clusters according to one example of the present disclosure. In some examples, the processing device 203 can implement some or all of the steps shown in FIG. 3. Additionally, in some examples, the processing device 203 can be executing a software operator 220 to implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIGS. 1-2.

At block 302, the processing device 203 can receive, from a client device 204, a custom resource request 222 including a set of requirements 224 for a bare metal cluster 206. The set of requirements 224 can include a number of nodes 216 for the bare metal cluster 206, a number of management nodes, a number of worker nodes, a type of cluster, a version of the cluster, or other suitable requirements for the bare metal cluster 206. In a particular example, the set of requirements 224 can include Kubernetes as the type of cluster, 1.24 as the version of the cluster, three worker nodes, and one management node.

At block 304, the processing device 203 can determine a set of resources 218 that satisfies the set of requirements 224. The set of resources 218 can include at least two virtual IP addresses 214 and a set of baseband management controller (BMC) IP addresses 212. A number of the BMC IP addresses in the set of BMC IP addresses 212 can be equal to the number of nodes 216 for the bare metal cluster 206. Thus, in the particular example, the set of BMC IP addresses 212 can include four BMC IP addresses. Additionally, the at least two virtual IP addresses 214 can include an API IP address 115 and a corresponding ingress IP address 117.

In some examples, determining the set of resources 218 can include the processing device 203 recieving a first list 108a of BMC IP addresses and a second list 108b of virtual IP addresses. The lists 108a-b can be pre-configured lists transmitted to the processing device 203. The processing device 203 can also detect, in response to receiving the custom resource request 222, a subset of BMC IP addresses from the first list 108a that are available and a subset of virtual IP addresses from the second list 108b that are available. The processing device 203 can then select based on the set of requirements 224, the at least two virtual IP addresses 214 from the subset of virtual IP addresses and the set of BMC IP addresses 212 from the subset of BMC IP addresses.

At block 306, the processing device 203 can generate, based on the set of resources 218, a configuration file 210 for the bare metal cluster 206. The configuration file 210 can include the at least two virtual IP addresses 214 and the of BMC IP addresses 212. The configuration file 210 may also include information from the set of requirements 224, such as that the bare metal cluster 206 is to be a Kubernetes cluster, that the version of the bare metal cluster is version 1.24, and that the bare metal cluster 206 is to include three worker nodes and one management node.

At block 308, the processing device 203 can deploy, based on the configuration file 210, the bare metal cluster 206. In some examples, in response to deploying the bare metal cluster 206, the processing device 203 may update the first list 108a of BMC IP addresses to indicate that the set of BMC IP addresses 212 are unavailable. The processing device 203 may also update the second list 108b of virtual IP addresses to indicate that the at least two virtual IP addresses 214 are unavailable.

Additionally, or alternatively, during deployment of the bare metal cluster 206, the processing device 203 may detect a status 134 associated with a stage of deployment 136 of the bare metal cluster 206. Then, the processing device 203 can transmit, to the client device 204, the status 134 to indicate the stage of deployment 136 to the client device 204. The processing device 203 may also transmit access details 128 associated with the bare metal cluster 206 to the client device 204. The access details 128 can include the set of BMC IP addresses 212, the at least two virtual IP addresses 214, and one or more authorization credentials 132 usable by the client device 204 to access the bare metal cluster 206.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a processing device; and
a memory device that includes instructions executable by the processing device for causing the processing device to perform operations comprising:
   receiving, from a client device, a custom resource request comprising a set of requirements for a bare metal cluster, the set of requirements comprising a number of nodes for the bare metal cluster;
   detecting, in response to receiving the custom resource request, a plurality of baseband management controller Internet Protocol (IP) addresses that are available for executing the bare metal cluster;
   determining a set of resources that satisfies the set of requirements, the set of resources comprising at least two virtual IP addresses and a subset of the plurality of baseband management controller IP addresses, wherein a number of baseband management controller IP addresses in the subset of the plurality of baseband management controller IP addresses is equal to the number of nodes for the bare metal cluster;
   generating a configuration file for the bare metal cluster based on the set of resources; and
   deploying the bare metal cluster based on the configuration file.

2. The system of claim 1, wherein the operation of determining the set of resources that satisfies the set of requirements further comprises:
   receiving a first list of baseband management controller IP addresses and a second list of virtual IP addresses;
   detecting, in response to receiving the custom resource request, the plurality of baseband management controller IP addresses that are available for executing the bare metal cluster from the first list and a plurality of virtual IP addresses that are available for executing the bare metal cluster from the second list; and
   selecting, based on the set of requirements, the at least two virtual IP addresses from the plurality of virtual IP addresses and the subset of the plurality of baseband management controller IP addresses from the plurality of baseband management controller IP addresses.

3. The system of claim 2, wherein the operation of deploying the bare metal cluster causes the set of resources to become unavailable, and wherein the memory device further includes instructions executable by the processing device for causing the processing device to perform operations comprising:
   in response to deploying the bare metal cluster, updating the first list of baseband management controller IP addresses to indicate that the subset of the plurality of baseband management controller IP addresses are unavailable and updating the second list of virtual IP addresses to indicate that the at least two virtual IP addresses are unavailable.

4. The system of claim 2, wherein the memory device further includes instructions executable by the processing device for causing the processing device to perform operations comprising:
   receiving, from the client device, a termination request, wherein the termination request causes the custom resource request to be terminated, and wherein terminating the custom resource request causes the set of resources to become available; and
   in response to the custom resource request being terminated, updating the first list of baseband management controller IP addresses to indicate that the subset of the plurality of baseband management controller IP addresses are available and updating the second list of virtual IP addresses to indicate that the at least two virtual IP addresses are available.

5. The system of claim 1, wherein the memory device further includes instructions executable by the processing device for causing the processing device to perform operations comprising:
   detecting a status associated with a stage of deployment of the bare metal cluster;
   storing the status;
   receiving a status request from the client device; and
   in response to receiving the status request, transmitting, to the client device, the status to indicate the stage of deployment to the client device.

6. The system of claim 1, wherein the memory device further includes instructions executable by the processing device for causing the processing device to perform operations comprising:
   detecting a deployment failure of the bare metal cluster; and
   transmitting, to the client device, a report indicating the deployment failure, the report comprising a stage of deployment at which the deployment failure occurred.

7. The system of claim 1, wherein the memory device further includes instructions executable by the processing device for causing the processing device to perform operations comprising:
   transmitting, to the client device, the subset of the plurality of baseband management controller IP addresses, the at least two virtual IP addresses, and one or more authorization credentials usable by the client device to access the bare metal cluster.

8. The system of claim 1, wherein the at least two virtual IP addresses include an application programming interface (API) IP address and a corresponding ingress IP address.

9. A computer-implemented method comprising:
   receiving, from a client device, a custom resource request comprising a set of requirements for a bare metal cluster, the set of requirements comprising a number of nodes for the bare metal cluster;
   detecting, in response to receiving the custom resource request, a plurality of baseband management controller Internet Protocol (IP) addresses that are available for executing the bare metal cluster;
   determining a set of resources that satisfies the set of requirements, the set of resources comprising at least two virtual IP addresses and a subset of the plurality of baseband management controller IP addresses, wherein a number of baseband management controller IP addresses in the subset of the plurality of baseband management controller IP addresses is equal to the number of nodes for the bare metal cluster;
   generating, based on the set of resources, a configuration file for the bare metal cluster; and
   deploying, based on the configuration file, the bare metal cluster.

10. The computer-implemented method of claim 9, wherein determining the set of resources that satisfies the set of requirements further comprises:

receiving a first list of baseband management controller IP addresses and a second list of virtual IP addresses;

detecting, in response to receiving the custom resource request, the plurality of baseband management controller IP addresses that are available for executing the bare metal cluster from the first list and a plurality of virtual IP addresses that are available for executing the bare metal cluster from the second list; and selecting, based on the set of requirements, the at least two virtual IP addresses from the plurality of virtual IP addresses and the subset of the plurality of baseband management controller IP addresses from the plurality of baseband management controller IP addresses.

11. The computer-implemented method of claim 10, wherein deploying the bare metal cluster causes the set of resources to become unavailable, and wherein the computer-implemented method further comprises:

in response to deploying the bare metal cluster, updating the first list of baseband management controller IP addresses to indicate that the subset of the plurality of baseband management controller IP addresses are unavailable and updating the second list of virtual IP addresses to indicate that the at least two virtual IP addresses is unavailable.

12. The computer-implemented method of claim 10, wherein the computer-implemented method further comprises:

receiving, from the client device, a termination request, wherein the termination request causes the custom resource request to be terminated, and wherein terminating the custom resource request causes the set of resources to become available; and in response to the custom resource request being terminated, updating the first list of baseband management controller IP addresses to indicate that the subset of the plurality of baseband management controller IP addresses are available and updating the second list of virtual IP addresses to indicate that the at least two virtual IP addresses are available.

13. The computer-implemented method of claim 9, wherein the computer-implemented method further comprises:

detecting a status associated with a stage of deployment of the bare metal cluster;

storing the status;

receiving a status request from the client device; and in response to receiving the status request, transmitting, to the client device, the status to indicate the stage of deployment to the client device.

14. The computer-implemented method of claim 9, wherein the custom resource request is a first custom resource request, and wherein the computer-implemented method further comprises:

detecting a deployment failure of the bare metal cluster; and transmitting, to the client device, a report indicating the deployment failure, the report comprising a stage of deployment at which the deployment failure occurred.

15. The computer-implemented method of claim 9, wherein computer-implemented method further comprises:

transmitting, to the client device, the subset of the plurality of baseband management controller IP addresses, the at least two virtual IP addresses, and one or more authorization credentials usable by the client device to access the bare metal cluster.

16. A non-transitory computer-readable medium comprising instructions that are executable by a processing device for causing the processing device to perform operations comprising:

receiving, from a client device, a custom resource request comprising a set of requirements for a bare metal cluster, the set of requirements comprising a number of nodes for the bare metal cluster;

detecting, in response to receiving the custom resource request, a plurality of baseband management controller Internet Protocol (IP) addresses that are available for executing the bare metal cluster;

determining a set of resources that satisfies the set of requirements, the set of resources comprising at least two virtual IP addresses and a subset of the plurality of baseband management controller IP addresses, wherein a number of baseband management controller IP addresses in the subset of the plurality of baseband management controller IP addresses is equal to the number of nodes for the bare metal cluster;

generating, based on the set of resources, a configuration file for the bare metal cluster; and deploying, based on the configuration file, the bare metal cluster.

17. The non-transitory computer-readable medium of claim 16, wherein the operation of determining the set of resources that satisfies the set of requirements further comprises:

receiving a first list of baseband management controller IP addresses and a second list of virtual IP addresses;

detecting, in response to receiving the custom resource request, the plurality of baseband management controller IP addresses that are available for executing the bare metal cluster from the first list and a plurality of virtual IP addresses that are available for executing the bare metal cluster from the second list; and selecting, based on the set of requirements, the at least two virtual IP addresses from the plurality of virtual IP addresses and the subset of the plurality of baseband management controller IP addresses from the plurality of baseband management controller IP addresses.

18. The non-transitory computer-readable medium of claim 17, wherein the operation of deploying the bare metal cluster causes the set of resources to become unavailable, and further comprising instructions that are executable by the processing device for causing the processing device to perform operations comprising:

in response to deploying the bare metal cluster, updating the first list of baseband management controller IP addresses to indicate that the subset of the plurality of baseband management controller IP addresses are unavailable and updating the second list of virtual IP addresses to indicate that the at least two virtual IP addresses are unavailable.

19. The non-transitory computer-readable medium of claim 17, further comprising instructions that are executable by the processing device for causing the processing device to perform operations comprising:

receiving, from the client device, a termination request, wherein the termination request causes the custom resource request to be terminated, and wherein terminating the custom resource request causes the set of resources to become available; and in response to the custom resource request being terminated, updating the first list of baseband management controller IP addresses to indicate that the subset of the plurality of baseband management controller IP addresses are available and updating the second list of virtual IP addresses to indicate that the at least two virtual IP addresses are available.

20. The non-transitory computer-readable medium of claim 16, further comprising instructions that are executable by the processing device for causing the processing device to perform operations comprising:

detecting a status associated with a stage of deployment of the bare metal cluster;

storing the status;

receiving a status request from the client device; and in response to receiving the status request, transmitting, to the client device, the status to indicate the stage of deployment to the client device.

* * * * *